United States Patent [19]

Gertz

[11] 4,439,983
[45] Apr. 3, 1984

[54] INLET TURBINE POWERED EXHAUST EXTRACTOR FOR INTERNAL COMBUSTION ENGINES

[76] Inventor: David C. Gertz, 7523 Quailwood Way, Citrus Heights, Calif. 95610

[21] Appl. No.: 319,449

[22] Filed: Nov. 9, 1981

Related U.S. Application Data

[63] Continuation of Ser. No. 959,788, Nov. 13, 1978, abandoned.

[51] Int. Cl.³ ............................................. F02B 35/02
[52] U.S. Cl. ....................................... 60/273; 60/315; 60/397
[58] Field of Search ................. 60/315, 320, 397, 605, 60/611, 614, 273; 123/25 F, 122 B, 557

[56] References Cited

U.S. PATENT DOCUMENTS

| | | | |
|---|---|---|---|
| 937,653 | 10/1909 | Sickenberger | 60/315 |
| 1,004,564 | 10/1911 | Gaskill | 60/315 |
| 1,006,907 | 10/1911 | Buchi | 60/605 |
| 1,417,483 | 5/1922 | Atwood | 123/25 F |
| 1,451,694 | 4/1923 | Haeberlein | 415/164 |
| 2,047,928 | 9/1933 | Haring | 60/315 |
| 2,379,541 | 7/1945 | Planiol | 60/266 |
| 2,644,295 | 7/1953 | Peterson | 60/605 X |
| 3,056,541 | 10/1962 | Foweraker | 415/160 |
| 3,059,415 | 10/1962 | Birmann | 60/611 |
| 3,158,990 | 12/1964 | Ferri | 60/203 |
| 3,417,562 | 12/1968 | Morris | 60/397 X |
| 3,570,240 | 3/1971 | Melchior | 60/600 |
| 3,765,382 | 10/1973 | Vandenberg | 123/557 |
| 3,886,919 | 6/1975 | Freeman | 123/122 B |
| 4,149,832 | 4/1979 | Sivolap | 60/605 |

FOREIGN PATENT DOCUMENTS 199229 10/1938 Switzerland .................. 60/315

Primary Examiner—Michael Koczo
Attorney, Agent, or Firm—Ralph B. Pastoriza

[57] ABSTRACT

A four-cycle internal combustion engine is provided with apparatus comprising a turbine in the inlet air flow path and an extracting compressor in the exhaust gas path. Where the internal combustion engine is an automobile engine and is operating under normal cruising conditions, the manifold inlet pressure is substantially less than atmospheric pressure and incoming air drives the inlet turbine to in turn drive the compressor. The arrangement is such that the inlet air is isentropically expanded while the exhaust gas back pressure is decreased. As a consequence, the energy of compression is reduced and the overall operating temperature of the internal combustion cycle is lowered with the result that more power is delivered for a given quantity of fuel.

3 Claims, 4 Drawing Figures

INLET TURBINE POWERED EXHAUST EXTRACTOR FOR INTERNAL COMBUSTION ENGINES

This application is a continuation of my copending patent application, Ser. No. 959,788 filed Nov. 13, 1978, now abandoned, and originally entitled REVERSE PHASE TURBO CHARGER FOR INTERNAL COMBUSTION ENGINES.

This invention relates generally to internal combustion engines and more particularly to a method and apparatus for throttling a four cycle engine in a manner to increase the efficiency of the throttled engine.

BACKGROUND OF THE INVENTION

The four cycle Otto engine was originally throttled by retarding the spark advance; however, this method of throttling was very inefficient and was replaced with today's method of using a butterfly carburetor valve. During the initial development of the automobile, the engine had a low compression ratio and was underpowered, compared to the weight of the vehicle. These early automobiles used nearly full power when cruising down the road and relied on the engine throttle primarily to control the engine during city traffic conditions.

During the subsequent evolution of the automobile, the engines became more powerful relative to the weight of the automobile, and the automobile became more streamlined so that less work was required to propel a given weight. With more power per weight, the automobile now had the ability to accelerate very quickly and provide the agility needed in traffic conditions.

The development of automobiles with today's power-to-weight ratio created a condition whereby the engine was throttled to produce only ten percent to twenty percent of its full power when cruising at 55 MPH. During cruising conditions when the engine is throttled to fifteen percent of full power, the efficiency of the engine drops from around thirty percent to half, or fifteen percent.

The inherent inefficiency of today's method of throttling automobile engines during cruising conditions has been recognized by many researchers and has led to a number of solutions.

The first method used was to replace the automobile engine with a diesel engine which is more efficient during partial loading conditions. This solution has not been very acceptable, however, because the total automobile fleet could not convert to the use of diesel fuel. In addition, there are inherent problems with the diesel engines, such as pollution, cost and lack of power available.

Another method being used is to reduce the engine size and install a turbo charger to provide the additional full load power. This method has not been readily accepted, primarily because of the lag time involved to achieve full power and/or turbine wear problems.

Still other methods of improving partial load efficiency have been to use compound engine systems that use an exhaust turbine for an engine bottoming cycle such as a Rankine steam engine which runs on exhaust heat. These methods have not proven very acceptable because of the small relative gains versus the cost and maintenance problems.

More recently, researchers have studied using solenoid-actuated valves to reduce the number of cylinders being used. This method has not been judged acceptable because of the problems of controlling the system and the increased engine wear.

Another similar method uses solenoid valves to control the intake timing. This method also produces rough engine running conditions, which produces engine wear.

The most popular methods being researched today use the engine intermittently at full power and use stored power during partial load conditions. Fly wheels and variable transmissions have been used by some researchers, while others have used batteries to store engery which powers a small electric engine. Still other researchers have used a second smaller engine, such as a motorcycle, attached to the back of the car to power the automobile during cruising conditions. These methods have accomplished drastic improvements in the operating efficiency of the automobile by operating the engine at thirty percent efficiency rather than fifteen percent during cruising conditions.

All of the known methods proposed, however, have a major limitation in that the engine life is reduced and the driver of the automobile is inconvenienced. The cost trade-off of these methods is justified, however, because the fuel savings outweigh the increased cost and inconvenience.

Where the Otto engine has been used in the development of aircraft, researchers built test stands to test the engine performance under flight conditions. The major reason for performing these tests was to determine the power available at a given altitude and to develop methods of de-icing the carburetor. These tests developed power-fuel flow data for the pilots so that they could estimate flight range and speed of travel. An example of such a test stand is in Swiss Pat. No. 199,229.

At present, most aircraft with Otto engines have a service manual which shows the power and fuel flow for given altitude conditions. These charts usually show operating conditions up to 25,000 ft. The service ceiling for most propeller-driven aircraft is 25,000 ft, at which point the air density is about half that at sea level. At this altitude, the engine can only produce half of the power available at sea level. Under these conditions, the airplane engine is operating at the same efficiency as at sea level and the fuel flow charts show that the fuel consumption per mile is the same regardless of altitude. The reason there is no apparent difference is that the efficiency of a throttled engine starts to decrease at the half-throttled condition.

Pilots of today's jet aircraft are not limited to the 25,000 ft. service ceiling because the aircraft are not propeller driven and have more power available. The propeller is limited in altitude because as the air gets thinner, the revolutions per minute of the propeller cannot be increased (Mach I tip speed limit). The attack angle of the propeller is therefore increased up to a near stall condition at the service ceiling.

With the introduction of jet aircraft, many pilots now fly up to a service ceiling of 41,000 ft. These pilots are equipped with service manuals which show fuel flow per mile travelled. There is unanimous agreement among these pilots to get to altitude quickly and stay at altitude to conserve fuel. At the service ceiling, they are flying at about twenty-five percent of full power at sea level. There is a general misconception among these pilots as to why they get less fuel consumption at altitude. Most believe that the air is thinner and so the drag is reduced. In actuality, the lift-to-drag ratio is constant for a given attack angle and velocity increases with decrease in the density of the air.

It is not obvious to most pilots of jet aircraft that, in fact, when the jet engine is operating in thinner air, the fuel-to-air ratio can be maintained high and the combustion temperature maintained high for good efficiency. If the same aircraft has to reduce its altitude and still run at twenty-five percent of full power, then the jet engine has to be run with a greater air-to-fuel ratio and this lowers the combustion temperature and the engine efficiency.

The use of altitude or reducing the density of the air is therefore a very efficient way of throttling a jet engine. The same is true for a diesel engine, in which case the combustion temperature can be maintained high during throttling rather than reducing the temperature by decreasing the fuel-to-air ratio.

It is not obvious, however, that an Otto engine can be efficiently throttled by the same means. In the Otto engine, the fuel-to-air ratio remains constant as does the combustion temperature. In the Otto engine, the inefficiency of throttling with a butterfly valve is caused by an apparent increase in inlet temperature and an apparent increase in back pressure.

If an Otto engine were operating at 41,000 ft., it would receive inlet air at 1/5 the pressure of sea level and at $-60°$ F. The engine would also exhaust to an atmosphere of 1/5 the pressure of sea level. The power produced by the Otto engine would be about twenty-five percent of full power at sea level and at nearly maximum efficiency.

If the same engine operating at 41,000 ft. were to have the inlet temperature raised to 100° F., and the back pressure increased to sea level pressure, the efficiency of the engine would be drastically reduced. From this phenomenon, I have therefore deduced that the Otto engine can also be very efficiently throttled by the use of altitude or reducing the density of the air.

BRIEF SUMMARY OF THE INVENTION

With the foregoing in mind, the present invention provides a method of throttling four cycle internal combustion engines utilizing a turbine at the engine inlet, which powers a compressor at the engine exhaust, and a cooler prior to the compressor, wherein the engine is throttled and produces less than full power because it is apparently running at a higher altitude.

More particularly, in accord with the basic method of this invention, the inlet air to the internal combustion engine is isentropically expanded. The exhaust gas back pressure in turn is decreased. These steps alter the Otto cycle in a manner to reflect a decrease in compression energy and a lower overall temperature of operation of the internal combustion cycle. The result is an increase in the overall isentropic expansion or power delivered for a given quantity of fuel.

The method further contemplates varying the flow of inlet air to be isentropically expanded to thereby control the speed and throttling of the engine.

In the preferred embodiment of the method steps, a turbine is powered by inlet air through appropriate ducting passing to the internal combustion engine. This turbine in turn drives an outlet compressor in the outlet exhaust gas path which accelerates exhaust gases from the internal combustion engine.

Further features of the invention are the provision of variable pitch vanes at the inlet to the turbine to thereby provide a means for controlling the speed and throttling of the internal combustion engine and the addition of a water injector and condenser.

From the foregoing, it will be appreciated that a basic object of the present invention is to provide an efficient method of throttling an automobile engine which does not increase engine wear, cause pollution or an inconvenience to the driver of the automobile.

BRIEF DESCRIPTION OF THE DRAWINGS

A better understanding of this invention as well as further features and advantages thereof will be had by referring to the accompanying drawings in which.

DETAILED DESCRIPTION OF THE PREFERRED EMBODIMENT

Figure 1:
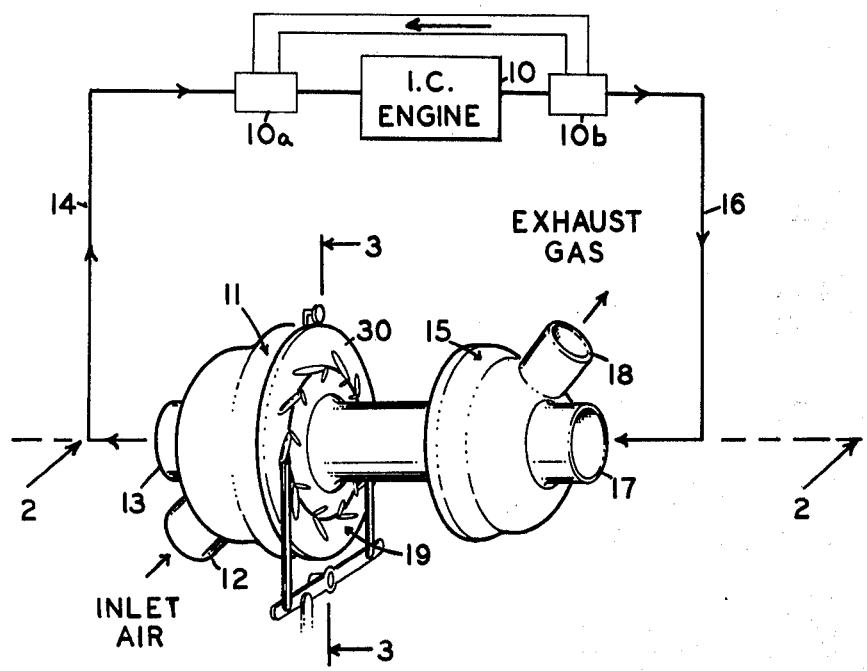
FIG. 1 is a perspective view of the apparatus of this invention shown for operation with a modified internal combustion engine illustrated in block form.

Referring first to FIG. 1, there is shown at the top portion of the drawing by means of the block 10 a conventional internal combustion engine which might be an automobile engine. The apparatus of the present invention is shown below the block 10 and includes means generally designated by the arrow 11 including an inlet turbine and inlet air ducting for passing inlet air received in an inlet port 12 to the engine from outlet 13 as depicted by the line 14. Outlet means designated generally by the arrow 15, in turn, includes an outlet compressor and appropriate outlet exhaust gas ducting for receiving exhaust gas on the line 16 into inlet port 17 and expelling the exhaust gas out an outlet port 18.

Also schematically depicted in FIG. 1 is a manually controllable means 19 for varying the inlet air flow to the turbine in the inlet means 11 to thereby control the speed and throttling of the internal combustion engine 10.

Figure 2:
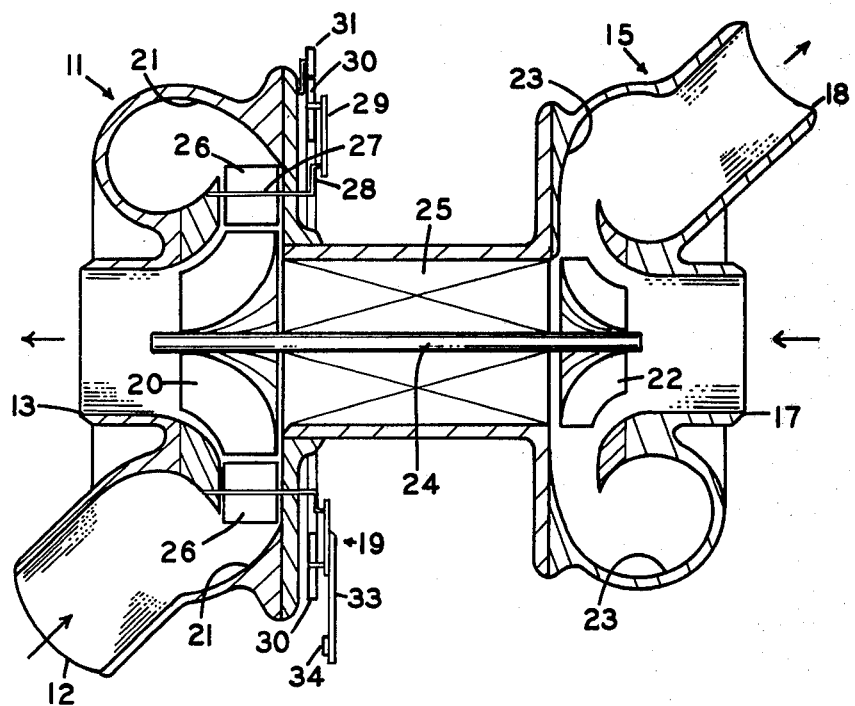
FIG. 2 is an enlarged cross section with certain components in full lines of the apparatus taken in the direction of the arrows 2—2 of FIG. 1.

Referring now to the enlarged cross section of FIG. 2, further details of the invention will be evident. Referring first to the left hand portion of FIG. 2, the inlet air turbine in the inlet means 11 is indicated at 20 and receives inlet air through the port 12 which is guided by smoothly curved internal air ducting surfaces 21 to pass into the inlet annulus of the turbine, through the turbine and outlet annulus at port 13 to the internal combustion engine as described in FIG. 1. The inlet annulus of the turbine is of larger diameter than the outlet annulus of the turbine, as is evident from FIG. 2.

The outlet compressor in the outlet means 15 is shown at 22 the compressor accelerating exhaust gases received in its inlet annulus at the port 17, these exhaust gases leaving the compressor at its outlet annulus and being guided by interior smooth curved surfaces 23 out the outlet 18. The inlet annulus for the compressor is of smaller diameter than the diameter of the outlet annulus for the compressor as is also clear from FIG. 2.

A common shaft 24 mounted in bearings 25 connects the turbine 20 to the compressor 22 so that the turbine 20 drives the compressor.

The interior smoothly curved air and gas ducts 21 and 23 respectively constitute important features of the present invention in that they assure a maximum or optimum pressure change across the turbine and compressor respectively.

As briefly mentioned heretofore, speed and throttling of the internal combustion engine can be effected by controlling the inlet air flow to the turbine 20. Such is accomplished in accord with this invention by means of a plurality of variable pitch vanes shown at 26 in FIG. 2 at the inlet to the turbine 20, by changing the pitch of the vanes from open to closed positions. In FIG. 2, the vanes 26 are shown in completely open position. A rotation of these vanes through 90° will result in a completely closed position.

In order to manually control the pitch position of the vanes simultaneously, each vane is mounted for rotation on a shaft such as the shaft 27 shown in the upper portion of FIG. 2 for the vane 26. Shaft 27 in turn is rotated by an appropriate link 28 actuated by arm 29 pivoted to a ring 30. It will be understood that all the various other vanes similarly have shafts 27 coupled by way of similar links 28 and arms 29 to circumferentially spaced points on the ring 30.

Figure 3:
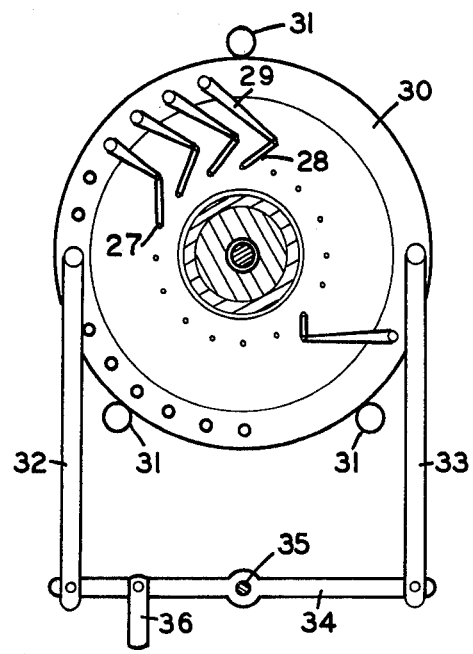
FIG. 3 is a schematic view partly in cross section of one type of throttle control looking in the direction of the arrows 3—3 of FIG. 1.

Referring specifically to the front view of the ring structure 30 as shown in FIG. 3, some of the various links 28 and arms 29 for vane shafts 27 are shown circumferentially spaced on the ring 30.

Ring 30 is supported by external roller bearings 31 for rotation about a central axis normal to the plane of the drawing of FIG. 3. Only slight rotational movement of the ring 30 is necessary to vary the pitch of all of the vanes simultaneously.

Such slight rotation in accord with the particular example illustrated in FIG. 3 is imparted by arms 32 and 33 pivoted to diametrically opposite points on the ring 30 and extending downwardly to opposite ends of a lever 34 centrally pivoted at 35. An actuating link 36 in turn is connected at a spaced point from the pivot 35 for the lever 34 so that downward or upward movement of the link 36 will rock the lever arm 34 and thus cause a slight rotation of the ring 30 in one direction or the other.

It can be appreciated that the pitch of each of the various vanes will be changed by equal amounts simultaneously with the foregoing mechanism. Other equivalent means for enabling manual control of the pitch of the vanes simultaneously can be used.

Figure 4:
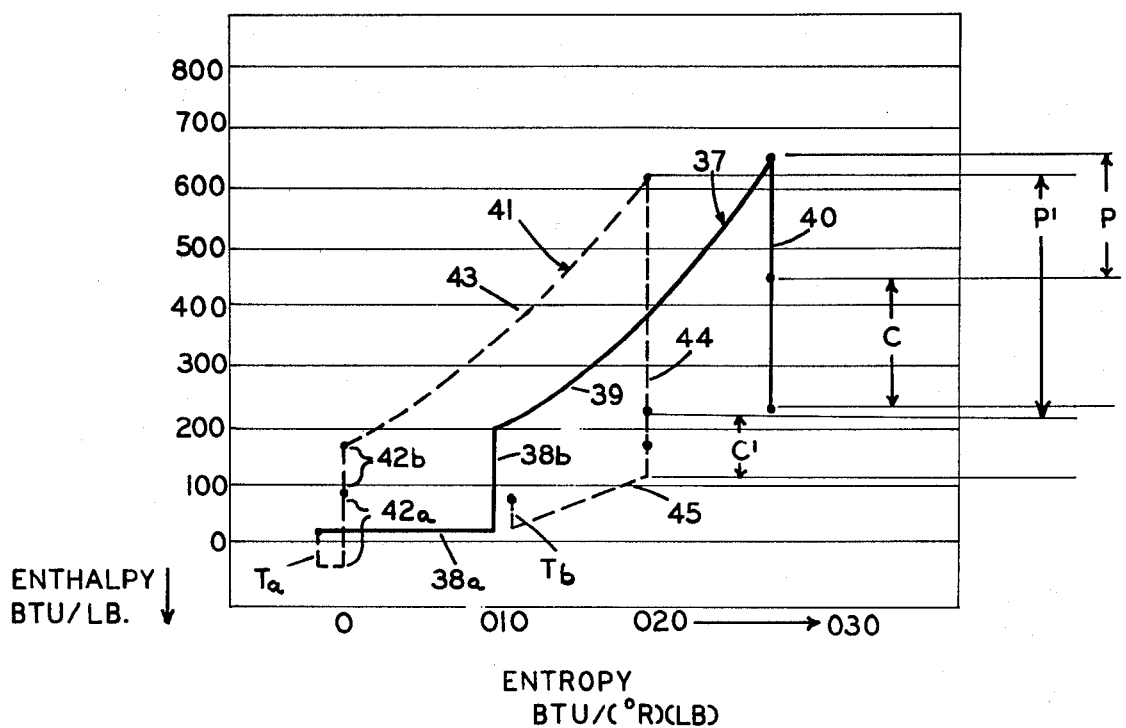
FIG. 4 is an enthalpy-entropy diagram of the internal combustion cycle showing the operating characteristics of the internal combustion engine with and without the turbine and compressor apparatus.

Referring now to FIG. 4, there is shown an enthalpy-entropy diagram somewhat idealized showing by means of the solid line graph 37 the operating characteristics of the internal combustion engine without the turbine and compressor apparatus of this invention.

In most cars during ordinary cruising conditions, the internal combustion engine is operating at a manifold pressure of approximately five pounds per square inch absolute. The inlet manifold pressure is reduced in the carburetor butterfly throttle. The pressure drop at the inlet takes place at constant enthalpy and is nearly isothermal. This characteristic is shown by the solid line portion 38a in the plot 37 of FIG. 4.

There then occurs an isentropic compression indicated by the line 38b. Combustion of the air fuel mixture in the cylinder is indicated by the line 39 and the isentropic expansion indicated by 40. The isentropic expansion contains two segments: P is the power delivered and C is the power that is used for compression.

Still referring to the enthalpy-entropy diagram of FIG. 4, there is superimposed the operating characteristic of a modified internal combustion engine utilizing the turbine and compressor apparatus of this invention, the latter plot being indicated by the dashed line graph 41.

The turbine and compressor apparatus can be used on a standard internal combustion engine; however, further improvements in efficiency can be realized when other modifications are made. FIG. 1 shows the optional addition of a fuel and water injector heater 10a and a condenser 10b. The condenser 10b is basically a finned coil which is placed in the exhaust pipe between the engine and the compressor inlet 17. The condenser cools the exhaust gas and heats an oil which runs to the injector heater 10a. Equal portions of gasoline and water are pumped at 250 psi pressure to the injector heater 10a. At the injector heater 10a the gasoline and water are vaporized by the heated oil from the condenser 10b. They are then further heated by heat from the engine head where they are injected directly into the cylinder 15° before top dead center. The vapor pressure of the steam gasoline mixture adds pressure to the engine compression part of the cycle as shown by 42b in FIG. 4.

In the new entropy diagram 41, the inlet air is isentropically expanded at the turbine throttle over the complete inlet air portion of the cycle as indicated at Ta. Compression of the air by the internal combustion engine is indicated at 42a. Additional pressure is then obtained when the steam and gasoline vapor is injected as indicated at 42b. Combustion of the air, fuel and steam mixture is indicated at 43 and the isentropic expansion at 44. The power delivered P' is much greater than that of the standard engine P and the compression work C' is less than that needed for the standard engine C. The condenser part of the cycle is indicated at 45 and the compression at Tb. The power to drive Tb is obtained from the power delivered by the turbine at Ta.

It will be seen from FIG. 4 that the combustion cycle takes place at a lower temperature than the combustion cycle depicted by the solid line graph 37. Moreover, because of the decrease in exhaust gas back pressure as a result of the condenser and the compressor in the exhaust flow path, the final exhaust gas temperature of the internal combustion cycle is lowered. Moreover, the isentropic expansion part of the power cycle indicated at 44 is considerably longer for the plot 41 than for the plot 37 and the work of compression C' is less for the plot 41.

Essentially, the Otto cycle is altered such that the internal combustion cycle has a lower exhaust gas temperature than would be the case in the absence of the turbine and the compressor of this invention.

The addition of the condenser not only helps reclaim waste heat, but has the added advantage of controlling emissions. The standard catalytic converter will not work with steam injection because the exhaust gas temperature is lowered and catalytic converters need high exhaust gas temperatures. The use of the condenser, however, will cause the steam to condense and in the process will solubilize the HC, CO, NOx, and SOx exhaust gas products. A holding tank for the polluted condensate water can be emptied when the car is filled with gas and water.

In the right of FIG. 4 there is depicted by the dimensions P and P' the respective expansion parts of the conventional cycle 37 and the modified cycle 41. The overall result is an increased power for a given amount of fuel; in other words, increased efficiency.

As mentioned heretofore, the various vanes 26 described in FIG. 2 can be adjusted by the mechanism of FIG. 3 to closed position wherein they are essentially tangential to the turbine 20 to a fully open position wherein they are essentially in radial alignment with the turbine. This adjustment of the vanes controls the amount of air flowing to the internal combustion engine and thus serves to control the speed and throttling of the engine.

If fuel injection is not used, the air flow into the inlet turbine comes from a modified carburetor. With fuel injection, a choke butterfly valve is provided for starting purposes. The inlet air as described drives the turbine which in turn drives the compressor by way of shaft 24.

Where the method and apparatus of this invention is used with a stationary constant speed internal combustion engine, the variable pitch vanes would not be essential. However, in the case of an automobile engine proper manual control of speed and throttling is desirable and thus in these latter embodiments, the variable pitch vane control is provided.

It can be appreciated from all of the foregoing that the present invention to some extent simulates high altitude conditions. However, exact simulation of high altitude conditions does not occur because of inherent inefficiencies in the inlet turbine. Also, the exhaust cooler does not cool the exhaust to the inlet temperature, and the compressor does not reduce the exhaust pressure to that of the engine inlet pressure. Therefore, the engine does loose some efficiency during throttling, compared to running at high altitudes, because the inlet temperature is higher and the exhaust back pressure is higher than what is would be at a comparable altitude. These losses, however, are much less than they would be if a butterfly throttle valve were used.

For the sake of example, it can be appreciated that a present day turbo charged 4-cycle engine does not exactly simulate below sea level running conditions for an engine because the inlet compressor and the exhaust turbine have inefficiencies. However, a turbo charged engine can increase the total available power without reducing the operating efficiency.

It is further to be appreciated that the present invention provides a throttling means that does not increase pollution or engine wear or cause operator inconvenience. Engine pollution is reduced by the present invention because the combustion process is more complete and the overall temperature of the cycle is reduced by the drop in the inlet temperature. In addition, the engine is burning less fuel, which creates less pollution. Engine wear is reduced because there is less carbon build-up and the engine receives less internal loading for a given throttled power output. The throttling device of this invention also receives very little wear because the load levels and temperatures are much less than those experienced by a turbo charger. The automobile operator is not inconvenienced because the throttling device of this invention is only functional during cruising conditions and so is never noticed during driving.

The throttling device of this invention provides a more efficient throttling means for 4-cycle engines and does not increase pollution, does not increase engine wear and does not cause operator inconvenience.

From all of the foregoing it will be evident that the present invention has provided a method and structure for increasing the efficiency of internal combustion engines.

I claim:

1. A method of improving the efficiency of a four-cycle internal combustion engine, including, in combination, the steps of:
   (a) isentropically expanding inlet air to said engine by passing the air through an inlet turbine having an inlet annulus of larger diameter than the diameter of its outlet annulus such that power is extracted from the inlet air to drive the turbine;
   (b) decreasing the exhaust gas back pressure from said engine by passing the exhaust gas through a driven outlet compressor having an inlet annulus of smaller diameter than the diameter of its outlet annulus; and
   (c) driving said outlet compressor directly by said turbine whereby the overall temperature of the internal combustion cycle is lower than in the absence of said turbine and compressor to thereby increase the thermodynamic efficiency by increasing the power delivered for a given quantity of fuel.

2. The method of claim 1, including the step of varying the flow of inlet air to be isentropically expanded to thereby control the speed and throttling of said engine.

3. The method of claim 2, including the step of providing a heat exchanger in the exhaust path between said engine and said outlet compressor for cooling the exhaust gas passing to said compressor.

* * * * *